Oct. 22, 1968   C. H. AQUARIUS   3,406,644
APPARATUS FOR MOULDING ARTICLES OF CANDY
Filed March 17, 1967   2 Sheets-Sheet 1
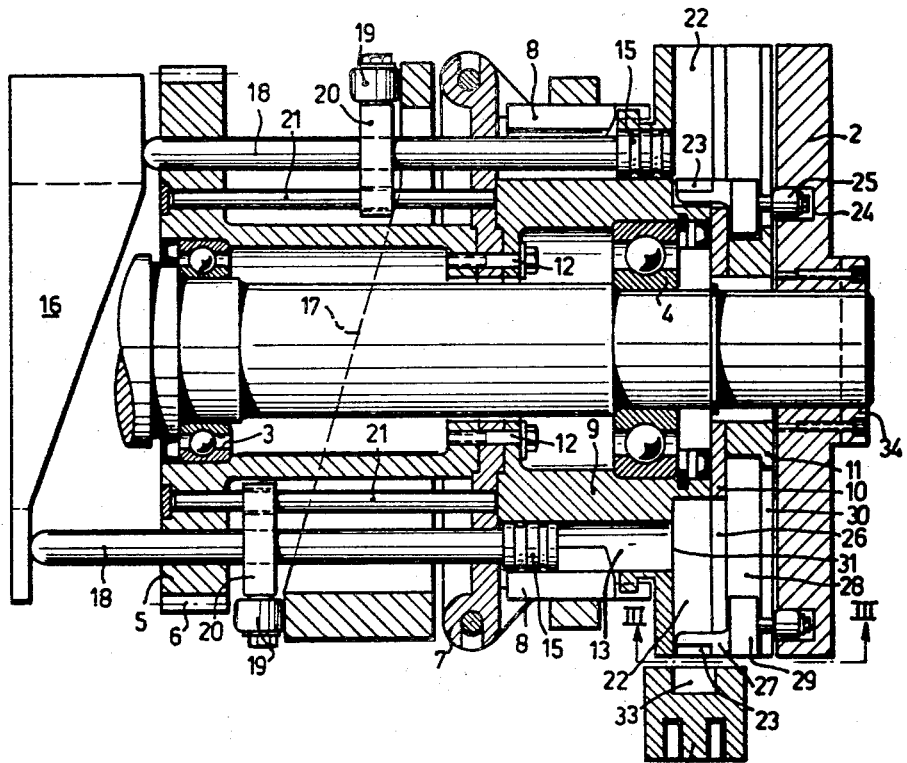
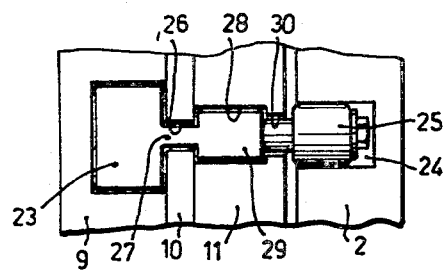
INVENTOR:
CONRARDUS HUBERTUS
BY    AQUARIUS
ATTORNEYS

3,406,644
**APPARATUS FOR MOULDING ARTICLES
OF CANDY**
Conrardus Hubertus Aquarius, 13 Kanaalstraat,
Weert, Netherlands
Filed Mar. 17, 1967, Ser. No. 623,908
Claims priority, application Netherlands, Mar. 18, 1966,
6603545
4 Claims. (Cl. 107—69)

ABSTRACT OF THE DISCLOSURE

An apparatus for moulding articles of candy in a rotary mould and discharging the moulded articles at predetermined spaced intervals greater than the intervals between the articles while in the rotary mould in order to permit subsequent continuous operations such as packaging.

---

The invention relates to an apparatus for moulding articles of candy such as lollipops, from a continuously fed deformable string of sugar. More particularly, it relates to moulding candy articles wherein is provided an apparatus with a rotary mould body having cavities at a cylindrical peripheral outer surface, which cavities are uniformly distributed over said surface, and, in cooperation with pivoting flaps also located around the periphery of the mould body, form chambers for continuously receiving a string of sugar. The flaps also serve to continuously cut the string into successive lumps of candy substantially without intermediate spaces between the lumps. In each chamber a moulding die is present being movable back and forth and parallel to the axis of rotation of the mould body to cause the severed lump which is present in the chamber to move to the one end of the chamber.

Because successive lumps of candy are continuously severed from the string of sugar and substantially without intermediate distances, between the lumps, practically no material of the string of sugar gets lost during the severing or cutting action.

It is an object of the invention to improve an apparatus of the above kind so that the rotary mould body discharges the moulded lumps of candy in such a manner that the lumps are regularly spaced with the spaces between the discharged lumps being considerably greater than the spaces between the severed moulded lumps of candy in the moulding chambers.

It is a further object of the invention to provide for discharging lumps of candy from the chambers at predetermined spaced intervals which enable a further treatment of the lumps of candy as a direct continuation of the severing action. This further treatment could consist in that the lumps of candy are directly ejected into receiving cavities of a conveyor moving along the bottom of the mould body, the spaced intervals of the ejected lumps then corresponding to the mutual distances—between centrelines—of the said receiving cavities. Such a conveyor then could place the received lumps onto a strip of thermoplastic wrapping material while maintaining their spaced intervals and a second strip of thermoplastic wrapping material could be placed on the series of lumps and the two strips of wrapping material connected to each other by making, rapidly and simply, a heat seal in the spaced interval between each two adjacent lumps of candy.

In general, in practicing the invention, the end of each axial chamber towards which the moulding die pushes the severed lump of candy connects with an associated outlet channel, which has a radial position in respect to the mould body, through a passage formed in the lateral wall of the outlet channel between both ends of said channel, the outer end of which opens on the cylindrical peripheral outer surface of the mould body. Between the ends of each outlet channel an ejector plunger is slidable up and down and is guided in such a way that the ejector plunger has an inward position in respect of the said passage opening towards the inner end of the outlet channel at the moment that the moulding die pushes the severed lump of candy through the passage and into the outlet channel.

When rotating the mould body, the severed lumps are ejected at spaced intervals the dimension of which, consequently, depends on the length of the arc between the radial longitudinal axes of two adjacent outlet channels, measured on the cylindrical peripheral surface of the mould body.

One embodiment of the apparatus and its method of operation according to the invention is further described with reference to the drawings wherein:

FIGURE 1 is a vertical longitudinal section of the apparatus;

FIGURE 3 is a view from below illustrating a part of the apparatus taken on the line III—III of FIG. 1.

Figure 2:
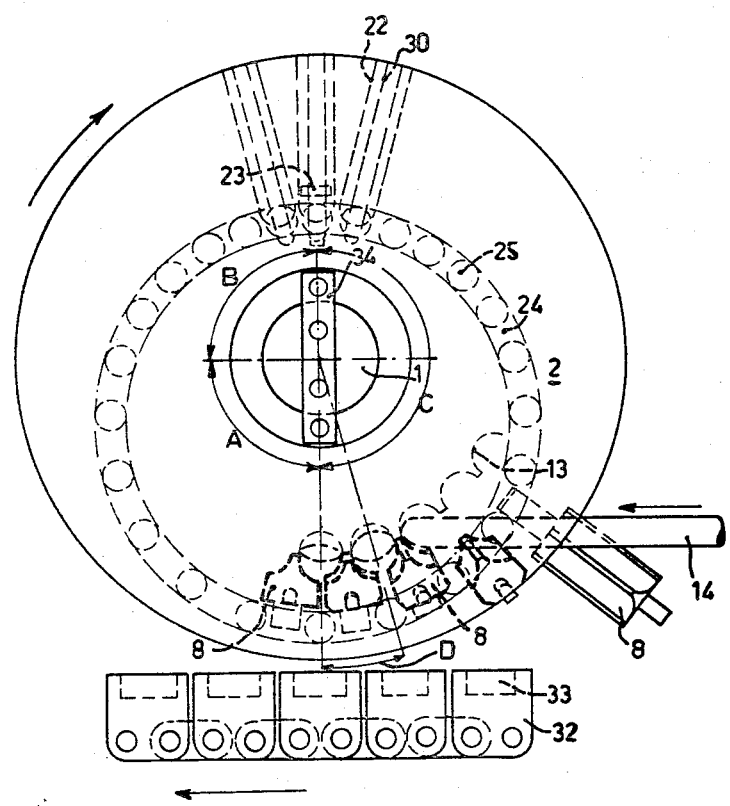
FIGURE 2 is a side view of the apparatus seen from the right in FIG. 1.

Referring to FIG. 1, a disc 2 is secured to a stationary shaft 1 by means of a strip 34. The latter is screwed onto the disc 2 and is countersunk in a diametral slope in the end face of shaft 1. An assembly, further called mould body, is rotatably carried upon the shaft mounted in ball bearings 3 and 4 respectively. This mould body is composed of a series of parts in the shape of discs or rings concentric with the shaft and rigidly connected with each other. These parts are: a driving sleeve 5 having a driving gear 6, and a flap support 7 for the flaps 8 which are pivotally carried upon the periphery of the support, an inner body 9, a partition plate 10 and a guiding lid 11. The parts 5, 7 and 9 are mutually connected by means of bolts 12. Also the parts 9, 10 and 11 are mutually connected, e.g. by bolts which are not illustrated. The flaps 8 are uniformly distributed over the periphery of the flap support 7. The cylindrical outer surface of the inner body 9 is provided with cavities 13. These cavities 13 are uniformly distributed over the periphery of the inner body 9. In closed position as seen in FIG. 2, each flap 8 covers two adjacent halves of two adjacent cavities 13. Consequently, two adjacent flaps in closed position together with one cavity define a chamber for moulding articles of candy. The flaps are operated to sever continuously successive lumps from the string of sugar 14 in a manner well known and thus are not further described. The string of sugar 14 is fed in the direction of the arrow in FIG. 2. The cavities 13 and the flaps 8 are so near to each other that the lumps which are severed from the string of sugar have substantially no separating distances. It follows from FIG. 2 that when severing adjacent lumps substantially no material of the string gets wasted. In each cavity or chamber 13 respectively a moulding die 15 is slidable between the ends of the chamber and parallel to the shaft 1. The reciprocating slidable motion is effected by means of two stationary cams 16 and 17. The ends of the rods 18 of the moulding dies 15 engage the cam 16 which causes the moulding dies 15 to move to the right as seen in FIG. 1. An arm 20 which is stationarily mounted on each rod 18 carries a roller 19 and said arm 20 is slidable on a rod 21. The rollers 19 engage the cam 17, whereby the moulding dies 15 as seen in FIG. 1 are moved to the left by means of this cam.

The one end of each cavity 13 opens on an outlet channel 22. These channels 22 are radial recesses in the inner body 9. They open on the cylindrical peripheral outer surface of the mould body. In each channel 22 an ejector plunger 23 is slidable up and down between the ends of the channel. The ejector plungers have a controlled guide in the stationary disc 2. On the inner surface the disc is provided with a circular groove 24 which is eccentric in respect of the axis of shaft 1 and mould body parts 5–11. Each ejector plunger 23 is guided into the groove 24 by means of a roller 25. Each ejector plunger 23 furthermore is guided into the partition plate 10 and into the guiding lid 11. In the partition plate 10 radial slots 26 are provided, a portion 27 of the ejector plunger 23 being slidably guided into each slot 26. Radial slots 28 are provided in the guide lid 11, a block portion 29 of the ejector plunger 23 being slidably guided into each slot 28. The roller 25 is mounted upon a lateral journal of the block 29. Each journal is slidably mounted in a radial slot 30 of the guiding lid 11. The slots 26 and 30 are narrower than the slots 28.

When rotating the mould body parts 5–11 around the shaft, the rollers 25 roll in the slot 24 of the stationary disc 2. Owing to the eccentricity of the slot 24 the ejector plungers 23 in the outlet channels 22 are moved up and down. FIG. 2 illustrates an ejector plunger 23 in its outermost position, and an ejector plunger in its innermost position. The disc 2 is mounted on the shaft 1 in such a position that each ejector plunger is in its innermost position at the moment that the moulding die 5 causes a lump severed from the string of sugar 14 to move out of the chamber 13 and through the passage 31 into an outlet channel 22. This situation is illustrated at the top of FIG. 1. Then the ejector plunger 23 causes the lump of sugar to move in the direction of the outer periphery of the inner body 9 and there the lump is ejected.

In FIG. 2 three arcs, A, B and C are illustrated. The arc A indicates the track during which the flaps 8 have completely severed a lump from the string of sugar 14 when the mould body parts 5–11 revolve. The arc B indicates the track during which a moulding die 15 moves the lump of candy into the direction of the passage 30. The arc C indicates the track during which a lump of candy is moved outwards and ejected by an ejector plunger 23. During this track, consequently, each ejector plunger 23 moves from the position at the top of FIG. 1 to the position at the bottom of FIG. 1.

The ejected lumps of the string are received one by one into a die having a receiving space, or onto a conveyor having receiving spaces which are at spaced equal intervals. Exactly at the moment that a lump of candy is ejected by an ejector plunger 23 a receiving space 33 is below it. The rotational speed of the mould body 5–11 has such a related relation to the conveying speed of the conveyor 32 that each time when an ejector plunger 23 ejects a lump of candy, there is a receiving space 33 just below it to receive the lump of candy. It follows from FIG. 2 that a lump of candy is ejected each time that the mould body 5–11 has passed through an arc D. Therefore, the length of this arc D determines the final spaced intervals between the ejected lumps of candy.

What is claimed is:

1. An apparatus for moulding articles of candy such as lollipops from a continuously fed deformable string of sugar, said apparatus being provided with a mould body rotatably mounted on a shaft and having cavities at a cylindrical peripheral outer surface, said cavities being uniformly distributed over said surface and, in cooperation with pivoting flaps located around the periphery of the mould body, forming chambers for moulding articles of candy, said flaps severing continuously the string into successive lumps of candy, substantially without spaced intervals and in each chamber a moulding die being slidable back and forth and parallel to the axis of rotation of the mould body, means for moving said die causing the severed lump of candy which is present in the chamber to move to one end of the chamber, the improvement comprising that the said one end of each axial chamber connects to an associated outlet channel radially positioned with respect to said mould body through a passage in the lateral wall of the outlet channel situated between both ends of said channel, the outer end of said channel opening on the cylindrical peripheral outer surface of the mould body, and an ejector plunger located in and between the ends of the outlet channel, means for slidably guiding said ejector plunger up and down in such a manner that the ejector plunger has an inward position in respect of the said passage towards the inner end of the outlet channel at the moment that the moulding die pushes the severed lump of candy through the passage and into the outlet channel.

2. An apparatus according to claim 1 wherein the means for guiding of the ejector plunger consists of a guiding groove eccentrically positioned with respect to said shaft and formed in an end disc attached to said shaft, and a guiding roller connected to said plunger and positioned in said groove.

3. An apparatus according to claim 2 further including portions connected to said ejector plunger having a radial and guided slidable movement in radial slots provided in two adjacent disc-shaped portions located between said end disc and a portion of the mould body, the peripheral outer surface of which is provided with said cavities for receiving the lumps of said string.

4. An apparatus acording to claim 1, further including conveying means positioned adjacent to said mould body and adapted to receive discharged lumps from said outlet channels, and means for adjusting said conveyor speed in relation to said rotational speed of said mould body and the radial spacing of said outlet channels to provide predetermined spaced intervals between said discharged lumps.

References Cited

UNITED STATES PATENTS

| | | | |
|---|---|---|---|
| 1,967,565 | 7/1934 | Thurlings | 107—69 X |
| 2,027,915 | 1/1936 | Kux | 107—15 X |
| 3,039,404 | 6/1962 | Johnston et al. | 107—8 |

WALTER A. SCHEEL, *Primary Examiner.*

JOSEPH SHEA, *Assistant Examiner.*